Patented July 4, 1933

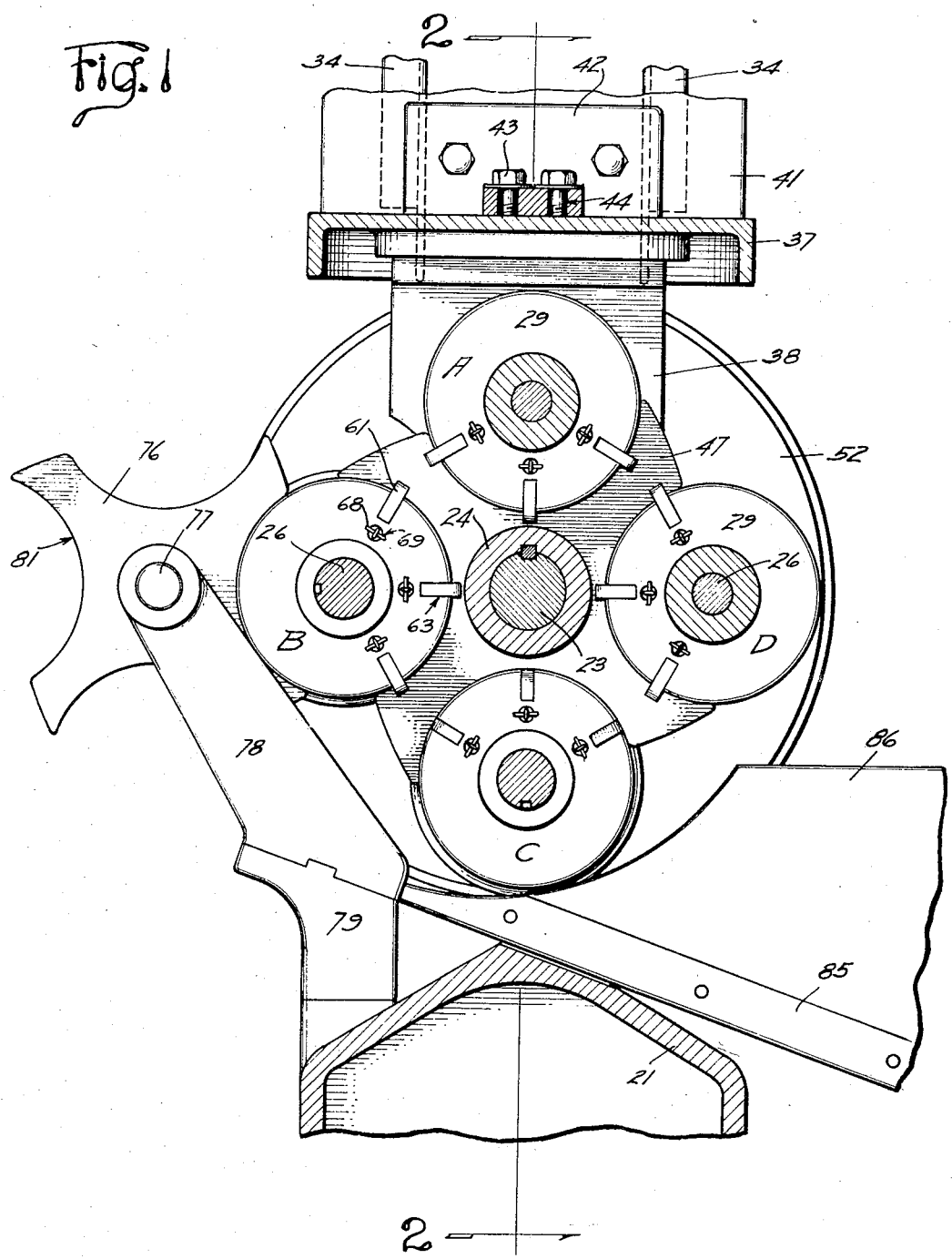

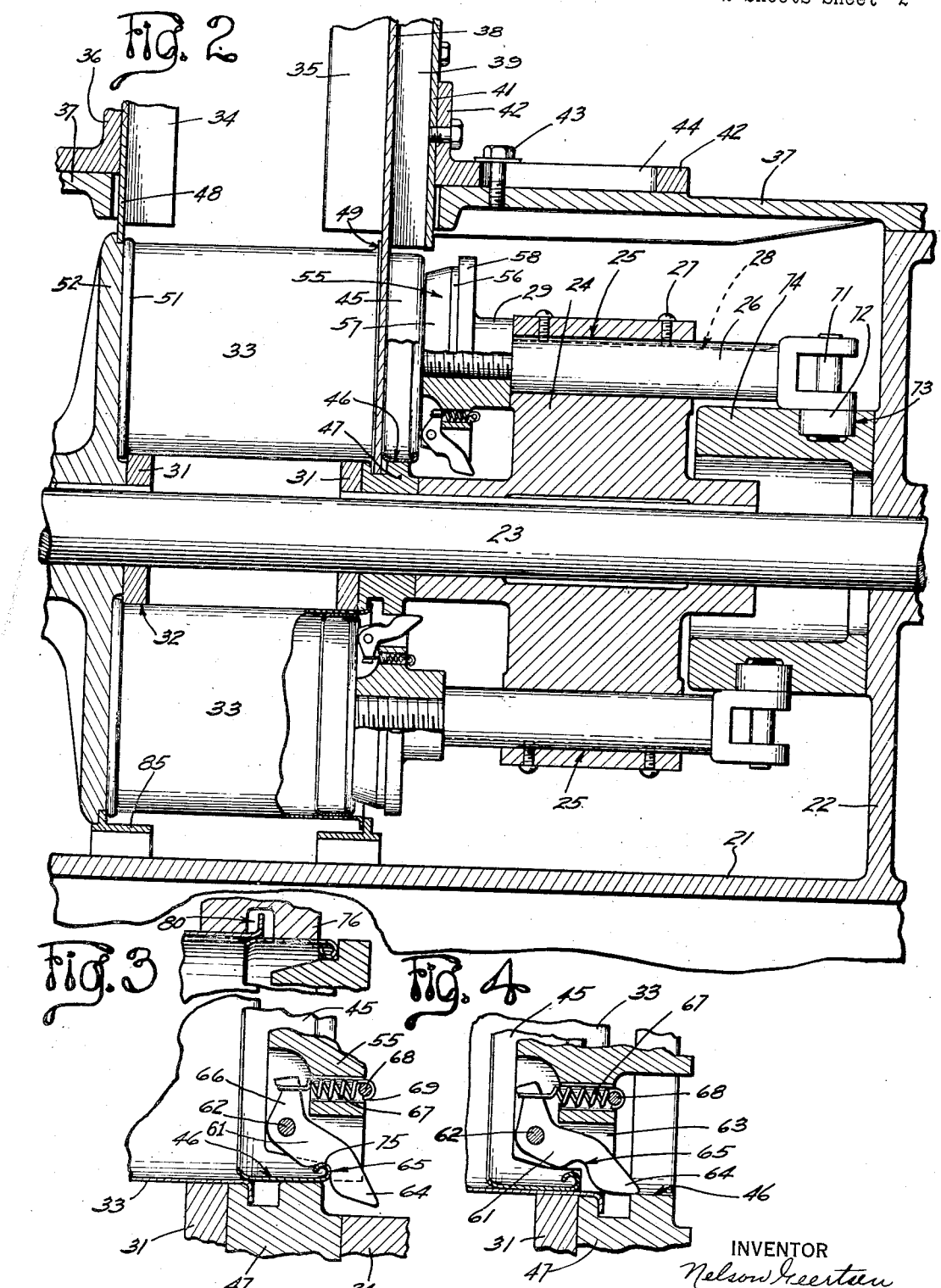

1,916,260

UNITED STATES PATENT OFFICE

NELSON GEERTSEN, OF CHICAGO, ILLINOIS, ASSIGNOR TO AMERICAN CAN COMPANY, OF NEW YORK, N. Y., A CORPORATION OF NEW JERSEY

COLLAR AND CAN ASSEMBLING MACHINE

Application filed September 23, 1929. Serial No. 394,475.

The present invention relates to an apparatus for assembling a separate collar member within a can body to produce a tearing strip container.

The machine in the present invention comprises some parts similar to those embodied in the machine of the Peters' Patent No. 1,834,107, granted December 1, 1931, and which is assigned to the same assignee as the present invention. The present invention contemplates the addition of certain features that produces a machine not requiring the accurate and close fitting parts sometimes needed.

The principal object of the present invention is the provision of a collar and can assembling machine wherein the collar is held in exact position during its insertion into the can body and is released prior to the removal of the inserting mechanism from the inserted collar.

An important object of the present invention is the provision of a machine having an inserting head comprising a chuck adapted to support the collar as it is being inserted in the can body, the chuck being considerably smaller than the collar to avoid frictional binding between chuck and collar, and the association of holding fingers for cooperating with the supporting surface of the chuck to hold the collar in exact alignment for the inserting operation.

A further important object of the invention is the provision of a collar inserting member adapted to enter inside of the collar prior to its insertion within a can body, the member having automatic holding devices for aligning the collar during its insertion, these holding devices moving to release the collar as it reaches its inserted position.

Numerous other objects and advantages of the invention will be apparent as it is better understood from the following description, which, taken in connection with the accompanying drawings, discloses a preferred embodiment thereof.

Referring to the drawings:—

Figure 1 is a transverse sectional view of the machine of the present invention.

Fig. 2 is a longitudinal sectional view taken substantially along the line 2—2 in Fig. 1, parts being shown in elevation.

Fig. 3 is an enlarged fragmentary section of the inserting chuck and associated parts illustrating a collar being aligned with a can body prior to its insertion.

Fig. 4 is a view similar to Fig. 3 illustrating the collar fully inserted in the can body.

The parts of the machine are supported upon a base 21 which carries side frames 22, there being only one such side frame illustrated in the drawings. Frames 22 carry a horizontal drive shaft 23 journaled for rotation in suitable bearings formed therein. A carrier member 24 is keyed to shaft 23 and constitutes the support for the inserting mechanism.

Carrier member 24 is provided with spaced horizontal passageways 25 in each of which is mounted a shaft 26 having sliding movement therein but being held against rotation on its own axis by setscrews 27 extending into a horizontal featherway 28 formed in the shaft. Each shaft 26 carries inserting members 29, there being illustrated four such members with their four shafts 26.

A can body rotating carrier is provided and comprises spaced can body turrets 31 each keyed to the shaft 23 and turning therewith. Each turret 31 is provided with can body receiving pockets 32 in which can bodies 33 fall by gravity from a chute positioned above the turrets 31. The can body chute may consist of vertical angle irons 34 and 35, the former being carried by a bracket 36 mounted on a cover plate 37 supported upon the frames 22, and the latter being connected with a vertical plate 38 which forms a partition between the can body chute and a collar chute 39. The collar chute has a back wall 41 which is bolted to a bracket 42 adjustably held by bolts 43 on the plate 37. Bracket 42 is provided with longitudinal slots 44 through which the bolts 43 extend, this permitting adjustment between bracket 42 and plate 37 when bolts 43 are loosened.

Annular collars 45 (Fig. 2) entering the machine move by gravity down the chute 39 and fall into a pocket 46 of a turret 47 carried on the shaft 23 between one of the turrets 31 and the carrier member 24. Both turrets 31 and the turret 47 move together with the shaft 23 and a pocket 46 of turret 47 together with two aligned pockets 32 of the turrets 31 present themselves beneath the collar and the can body chutes and receive respectively one collar 45 and one can body 33.

A can body 33 while moving toward the turret pocket is guided between the partition wall 38 and a spaced side plate 48 forming a part of angle brackets 34. The can body 33 may be provided with a flange 49 at one end and may have a bottom or end member 51 secured to the opposite end. On falling into position, the flanged end of the can body 33 is adjacent to the collar 45 but is separated therefrom by the wall 38. The opposite end 51 of the can body rests against a disc 52 keyed to the shaft 23 adjacent one of the turrets 31.

The can body turrets and the collar turret are illustrated in the drawings as comprising four pockets each and the entrance of the body and collar into these turrets as just described takes place at a station marked "A" in Fig. 1. As shaft 23 and the turrets move in their continuous counter-clockwise travel as viewed in Fig. 1, can body 33, collar 45 and the inserting head 29 associated therewith move to the position marked "B" at which place they are brought together. The collar is inserted within the can body during the travel of the turrets from the station "B" to a station "C" and at the latter place the can body with its inserted body is discharged, the empty turret pockets continuing their movement through an idle station "D" and back to the point of beginning.

Each inserting member 29 (Fig. 2) comprises a chuck 55 threadedly secured to the forward end of one of the shafts 26. Chuck 55 is provided with an annular collar engaging surface 56, a conical end 57 and an extended flange 58 which constitutes an annular collar propelling shoulder.

A plurality of fingers 61 (Figs. 1, 3 and 4) each pivoted on a pin 62 and positioned for operation in a radial slot 63 in the chuck 55 are carried by the inserting member 29. There is illustrated in the drawings, three fingers 61 grouped on one side of each member 29 and positioned adjacent the shaft 23. Each finger 61 is provided with an extension 64 and an arcuate pocket or notch 65 formed in the edge of the extension 64. Finger 61 is also provided with an extension 66 positioned on the opposite side of the pivot and connected by a spring 67 with a pin 68 held in a notch 69 formed in the rear wall of chuck 55.

During the rotary movement of the members 29 about the axis 23, the chuck 55, passing between stations "A" and "B", is caused to move into the adjacent collar carried in its turret pocket 46 and for this purpose each shaft 26 (Fig. 2) carries a pin 71 on which is loosely mounted a cam roller 72 operating in a cam groove 73 of a stationary cam 74 secured to one frame 22. As the carrier member 24 moves about the axis of its shaft 23 and carries the shaft 26 therewith, cam roller 72 is caused to traverse the cam groove 73 of the stationary cam 74 and by reason of the shape of the groove it and its chuck 55 is moved toward the collar. The tapered end 57 (Fig. 3) of the chuck 55 enters into the collar 45, the latter being prevented from longitudinal movement with the advancing chuck by the partition wall 38. Chuck 55 thus enters fully within the collar 45 and a curled edge 75 of the collar moves into the notches 65 of the three fingers 61, the fingers rocking on their pivots to permit this seating of the curl.

This positioning of one side of the curl of collar 45 in the fingers 61 is accompanied by a corresponding moving of the other side of the curl on to and over the annular collar supporting surface 56. In the fully engaged position of the curl 75 with the chuck 55, the rear edge thereof is against the collar propelling shoulder 58.

By the time chuck 55 is finally positioned in the collar 45, the collar and can body have been carried, in their circular path of travel, beyond the partition wall 38. Provision is made at station "B" for rounding or truing the flanged end of the can body and for also truing its associated collar prior to the collar inserting operation.

For this purpose, there is provided a turret 76 (Figs. 1 and 3) mounted on a shaft 77 carried by a bracket 78 supported on a block 79 fixed to the base 21. Turret 76 is provided with pockets 81 of a shape and size corresponding to the turret pockets 32 and 46 and each pocket 81 is grooved at 80 to allow clearance for the can body flange 49. Turret 76 and shaft 77 are rotated in timed relationship with the turrets 31 and 47.

The rounding up or truing of the can body, adjacent the flanged end, and of the collar before its complete insertion into the end of the can body, is accomplished by the solid wall of the pocket 81 of the turret, which conforms in contour to the contour of a normal can body, bearing snugly against the can body just inwardly of the flange 49, which rides freely in the groove 80, and against the body of the collar 45 outwardly of the flange 49, as clearly shown in Fig. 3.

At the station "B", collar and can body are in the position illustrated in Fig. 3 wherein one end of the collar is engaging and is about to enter into the flanged end of the can body. As the parts move from the station "B" to the station "C", the chuck 55 continues its forward movement and collar 45 is inserted a given distance within the open mouth of the can body to the position illustrated in Fig. 4.

During this inserting travel of the collar within the can body, the extension 64 of each finger 61 engages the wall of the turret pocket 46 of the turret 47 rocking the dog 61 on its pivot 62 against the action of the spring 67. This lifts notch 65 thereof from contact with the curl 75 and as the collar reaches its fully inserted position, each of the fingers 61 associated with the insertion of that particular collar is in the position illustrated in Fig. 4 wherein the collar 45 is entirely free from the fingers and rests only lightly upon the collar supporting surface 56 of the chuck 55.

This fully inserted position of the collar within the can body is reached just prior to the can body arriving at station "C" and at that time, that is, immediately following the insertion, the inserting head 29 is moved back and out of the can body. The can body is thereupon freed from the pocket of the turret 31 and falls from its position into a discharge chute composed of spaced channels 85 (Figs. 1 and 2) mounted on the base 21 and provided with side walls 86 between which the can rolls out of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine of the class described, the combination of means for arranging a flanged can body and a collar in axial alignment, a chuck mounted adjacent said arranging means and having movement in axial alignment therewith, said chuck having an annular collar supporting surface, means for moving said chuck along its axis to initially introduce its supporting surface within the collar and thence to insert the collar into the flanged end of the can, and devices cooperating with said supporting surface for securely holding said collar on the chuck during such insertion.

2. In a machine of the class described, the combination of means for arranging a flanged can body and a collar in axial alignment, a chuck mounted adjacent said arranging means and having movement in axial alignment therewith, said chuck having an annular collar supporting surface, and an annular collar propelling shoulder, means for moving said chuck along its axis to initially introduce its collar supporting surface within the collar and to position its collar propelling shoulder against one edge of the collar and thence to insert the collar into the flanged end of the can, and devices cooperating with said supporting surface for securely holding said collar on the chuck against its collar propelling shoulder during such insertion.

3. In a machine of the class described, the combination of means for arranging a flanged can body and a collar in axial alignment, a chuck mounted adjacent said arranging means and having movement in axial alignment therewith, said chuck having an annular collar supporting surface, means for moving said chuck along its axis to initially introduce its collar supporting surface within the collar and thence to insert the collar into the flanged end of the can, devices cooperating with said supporting surface for securely holding said collar on the chuck during such insertion, and means for effecting release of said collar from said chuck.

4. In a machine of the class described the combination of means for arranging a can body and a collar in axial alignment with each other, and in alignment therewith a collar inserting member, means for moving said member to insert the collar in the can body, radially movable devices carried by said member and movable relative thereto for engaging said collar and holding it in aligned position relative to said can body, and means for releasing said collar from said inserting member prior to a return movement of said member.

5. In a machine of the class described, the combination of means for arranging a can body and a collar in axial alignment with each other, and in alignment therewith a collar inserting member, means for moving said member to insert the collar in the can body, said member comprising a chuck having an annular collar supporting surface of less diameter than the diameter of the collar and carrying pivoted fingers engaging said collar and holding it on said supporting surface during insertion, and means for releasing said fingers from said collar to permit the removal of said chuck from the inserted collar.

6. In a machine for assembling a collar to a can body, in combination, means for holding and aligning a can body having a flange at an end to provide a widened mouth, means for holding a collar in alignment with said widened mouth, a reciprocating member for inserting said collar through said widened mouth into said body and means associated with and movable relative to said member and engaging the collar for holding said collar upon said member during the assembling operation.

7. In a container part assembling machine, means for holding a can body and a collar in preliminary aligned position, a collar engaging member, means for moving said member to bring said collar in assembled relation with said body and means hingedly connected with said member and engaging the collar to prevent shifting of said collar during the assembling operation.

8. In a machine for assembling a collar to a can body, in combination, a turret for holding a can body and collar in axial alignment, a reciprocating member for engaging and inserting said collar into said body, and resilient means cooperating with said member and engaging the collar to hold said collar from lateral movement during the assembling operation.

9. In a machine for assembling a collar to a can body, in combination, a rotatable turret for holding a can body, a second rotatable turret for holding a collar in axial alignment with said body, a reciprocating member for engaging and inserting said collar into said body, a device for rounding up said body and collar during their travel in said turrets, and a device associated with said member for yieldingly holding said collar from lateral movement during the assembling operation.

NELSON GEERTSEN.